United States Patent
Elliott

(10) Patent No.: US 8,830,619 B1
(45) Date of Patent: Sep. 9, 2014

(54) OVERWRITE THRESHOLD NUMBER OF TRACKS

(71) Applicant: Hewlett-Packard Development Company, L.P., Fort Collins, CO (US)

(72) Inventor: Robert C. Elliott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/907,693

(22) Filed: May 31, 2013

(51) Int. Cl.
*G11B 21/02* (2006.01)

(52) U.S. Cl.
USPC .......................................... 360/75

(58) Field of Classification Search
USPC ............ 360/125.03, 313, 122, 125.13, 77.12, 360/77.06, 48, 50, 31, 75
See application file for complete search history.

(56) References Cited

U.S. PATENT DOCUMENTS

| 8,310,786 | B2 | 11/2012 | de la Fuente et al. |
| 8,537,481 | B1 * | 9/2013 | Bandic et al. ................. 360/31 |
| 8,559,123 | B2 * | 10/2013 | Hirata et al. ................. 360/48 |
| 2012/0105994 | A1 | 5/2012 | Bellorado et al. |
| 2012/0162808 | A1 | 6/2012 | Masuda et al. |

OTHER PUBLICATIONS

Gibson, G., Principles of Operation for Shingled Disk Devices, (Research Paper), 2011, http://www.pdl.cmu.edu/ftp/News/newsletter11.pdf.
Ray, Shingled Magnetic Recording Disks, (Web Page), Oct. 4, 2012, http://silvertonconsulting.com/blog/2012/10/04/shingled-magnetic-recording-disks/.

* cited by examiner

*Primary Examiner* — Nabil Hindi
(74) *Attorney, Agent, or Firm* — Neel Patel

(57) ABSTRACT

A command is received to overwrite a medium. A threshold number of tracks is overwritten using a write head, in response to the command. The write head is then moved based on the threshold number. The threshold number is greater than one.

15 Claims, 3 Drawing Sheets

OVERWRITE THRESHOLD NUMBER OF TRACKS

BACKGROUND

Storage devices may be overwritten in order to wipe out sensitive data, such as previous user data. Manufacturers and/or vendors are challenged to provide processes for wiping out such sensitive data in a more expedient and/or lower cost manner.

BRIEF DESCRIPTION OF THE DRAWINGS

The following detailed description references the drawings, wherein.

DETAILED DESCRIPTION

Figure 1:
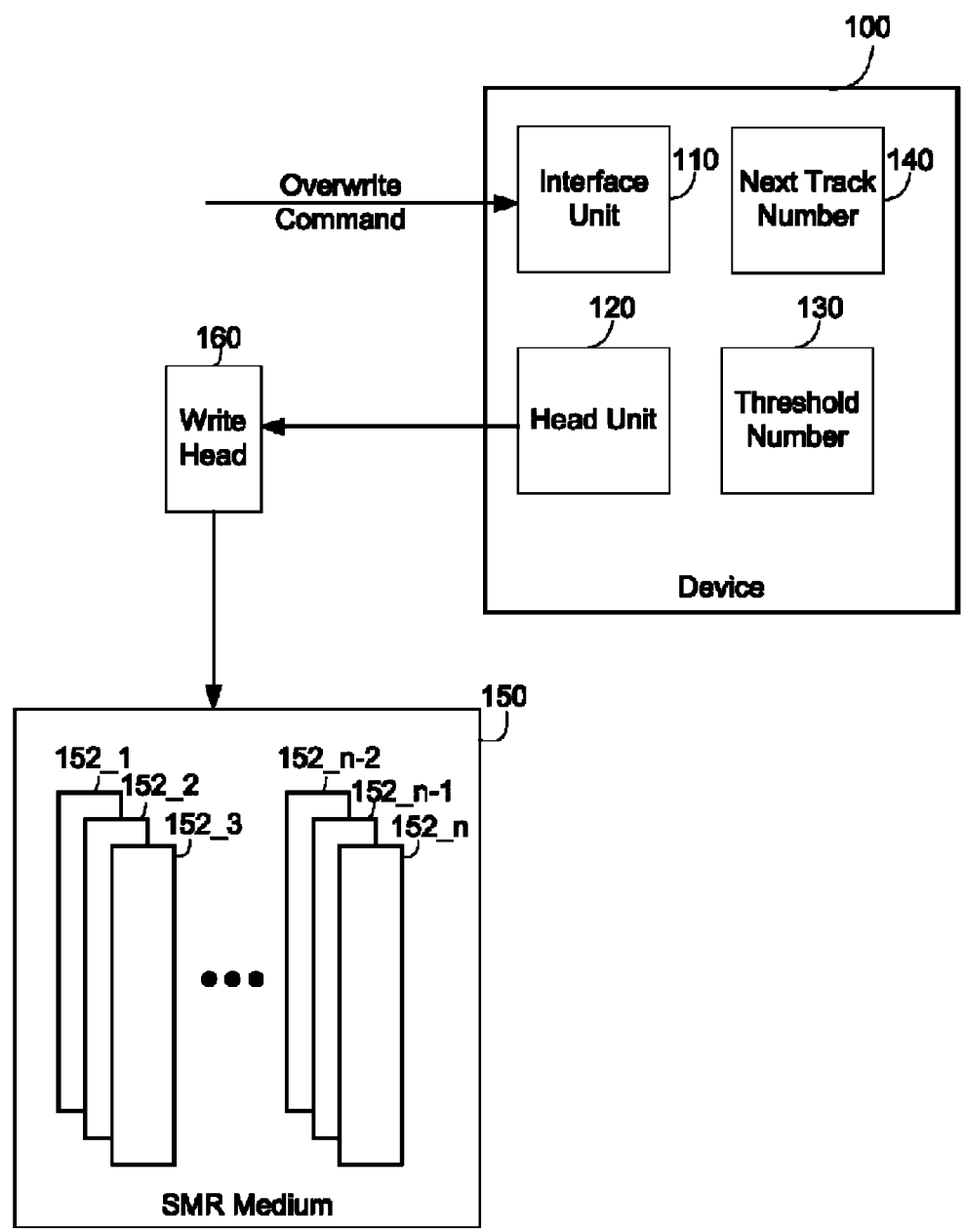
FIG. 1 is an example block diagram of a device to control a write head to move to a next track number based on a threshold number.

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

A storage device, such as a hard disk drive, may be repurposed or reused. However, before the storage device can be reused, original data on the storage device, such as user data, may be wiped. For example, an overwrite command, such as a Small Computer System Interface (SCSI) sanitize overwrite command may be sent to a SCSI device to overwrite an entire HDD, thus eliminating any user data previously written thereto. For large capacity HDDs, overwriting the entire HDD may take a substantially long amount of time, such as many hours.

The overwrite command may further specify how the storage device is to overwrite the data, such as a number of passes and/or a type of overwrite pattern. Some types of storage devices, such as Shingled Magnetic Recording (SMR) HDDs, may have a larger write head than a read head. Thus, the write head may overwrite multiple tracks on a single pass. For example, if the SMR HDD writes to a track n (where n is a natural number), the SMR HDD may also overwrite the data to a track n+1, due to the larger write head. Hence, the SMR HDD may first read the track n+1, then write to the track n and lastly write back to the track n+1, when receiving a command to write to the track n. As writing to the track n+1 may destroy or overwrite data of track n+2, this causes the above process to be repeated. Hence, spacing or gaps may be added after a number of tracks so that the above cascades of writes may be stopped.

Examples of present techniques may take advantage of the larger write head overwriting a plurality of tracks at once by issuing commands to the write head to skip over adjacent tracks which have already been overwritten. An example device may include an interface unit and a head unit. The interface unit may receive an overwrite command to overwrite at least part of a SMR medium. The head unit may control a write head to overwrite a threshold number of tracks of the SMR medium simultaneously, in response to the overwrite command. The head unit may control the write head to move to a next track number. The next track number may be based on offsetting a current track number by the threshold number. The current track number to be based on a position of the write head, when the write head is to overwrite the tracks of the SMR medium. The threshold number is greater than one.

Thus, examples of present techniques may reduce a time to overwrite the medium by reducing a number of passes of the write head over the medium before the medium is overwritten. For example, if the write head overwrites two tracks when commanded to only overwrite a single track, an example of the present technique may command the write head to only overwrite every other track in order overwrite or wipe all the tracks of the medium.

Referring now to the drawings, FIG. 1 is an example block diagram of a device 100 to control a write head 160 to move to a next track number based on a threshold number 130. The device 100 may couple to or be included in any type of computing device or controller that interfaces with a recording medium, such as a secure microprocessor, a storage device controller, a notebook computer, a desktop computer, an all-in-one system, a server, a network device, a wireless device and the like.

In the example of FIG. 1, device 100 interfaces with the write head 160 and write head 160 interfaces with a Shingled Magnetic Recording (SMR) medium 150. SMR may refer to a technique for partially overlapping, or shingling, adjacent tracks of a recording medium. For example, a track being written may overlap an adjacent track in SMR, unlike conventional techniques where the track being written does not overlap the adjacent track. The term recording medium may refer to any type of electronic, magnetic, optical, or other type of medium included in a physical storage device that stores data, such as a hard disk drive (HDD), solid-state drive (SSD) and the like.

The write head 160 may be any type of device that writes or records data on the medium 150, such as a magnetic disk or tape while a read head (not shown) may be any type of device that reads or senses data on the medium 150, such as the magnetic disk or tape. For writing, the surface of the disk or tape may be moved past the write head. By discharging electrical impulses at the appropriate times, bits are recorded as tiny, magnetized spots of positive or negative polarity. For reading, the surface may be moved past the read head, and the bits that are present induce an electrical current across the gap a read head. While described separately, the write head 160 and the read head may be part of a single unit.

The device 100 includes an interface unit 110 and a head unit 120. The interface and head units 110 and 120 may include, for example, a hardware device including electronic circuitry for implementing the functionality described below, such as control logic and/or memory. In addition or as an alternative, the interface and head units 110 and 120 may be implemented as a series of instructions encoded on a machine-readable storage medium and executable by a processor.

The interface unit 110 may receive an overwrite command, such as from a processor (not shown), to overwrite at least part of the SMR medium 150. For example, a user and/or operating system (OS) may issue the overwrite command to wipe the SMR medium 150 of private data. As shown in FIG. 1, the SMR medium 150 includes a plurality of tracks 151_1 to 151_n that overlap, as viewed by the write head 160 (but not the read head). For example, the second track 152_2 overlaps the first track 152_1 and the third track 152_3 overlaps the second track 152_2. Thus, there are no guard regions between the first to third tracks 152_1 to 152_3.

The head unit 120 may control the write head 160 to overwrite a threshold number 130 of the tracks 152_1 to 152_n of the SMR medium 150 simultaneously, in response to the overwrite command. The threshold number 130 may be based on, for example, a width of the write head 160, a distance between the write head 160 and the SMR medium 150, an opacity of air between the write head 160 and the SMR medium 150, the number of the tracks 152 the write head 160 can write to with a threshold percentage of certainty, a reliability of the SMR medium 150 and the like. The opacity of the air may be based on a dirtiness of the air, such as an amount of dust particles in the air.

The threshold percentage of certainty may define a likelihood that the write head 160 has overwritten the track 152. For example, there may be a 100% likelihood that n−2 tracks will be overwritten by the write head 160. However, there may only be a 50% likelihood that the n−1th track may be overwritten by the write head 160, a 25% likelihood that the nth track may be overwritten by the write head 160 and a 0% likelihood that the n+1th track may be overwritten by the write head 160. Here, if the threshold percentage is 90%, then the threshold number 130 will be n−2, where n is greater than 1.

The above likelihoods for the tracks to be overwritten may be determined experimentally or provided by a manufacturer and based on the above factors listed for determining the threshold number 130. The threshold number 130 is greater than one. For instance, because the tracks 152 are shingled, the write head 160 will at least overwrite the second track 152_2 when overwriting the first track 152_1. Thus, the threshold number 130 will be greater than one.

The head unit 120 may control the write head 160 to move to a next track number 140. The next track number 140 may be based on offsetting a current track number by the threshold number 130. The current track number may be based on a position of the write head 160 when the write head 160 is to overwrite the tracks 152 of the SMR medium.

For example, the current track number may be based on a number of the track 152 closest to an edge of the write head 160. The next track number 140 may be based on adding the threshold number 130 to or subtracting the threshold number 130 from the current track number. For example, if the current track number is 2 and the threshold number 130 is 3, the next track number 140 may be calculated by adding 3 and 2 to equal 5. In another example, the head unit 120 may control the write head 160 to move over a width of the threshold number of tracks 152 that have been overwritten when the head unit 120 controls the write head 160 to move to the next track number 140. For example, if the threshold number 130 is 3 and 3 overlapping tracks 152 together are 150 nanometers (nm) in width, then the head unit 120 may control the write head 160 to move inward 150 nm towards the center of the SMR medium 150 for the next track number 140.

The current track number may be based on the number of the track 152 closest to an inner edge of the write head 160 if the write head 160 is writing outward from a center of the SMR medium 150. On the other hand, the current track number may be based on the number of the track 150 closest to an outer edge of the write head 160 if the write head 160 is writing inward towards the center of the SMR medium 150. The current track number and the next track number 140 are shown in greater detail with respect to FIG. 2 below.

As the threshold number 130 is greater than one, a number of times the write head 160 may be moved (which is proportional to the threshold number 130) is less than the number of tracks 152_1 to 152_n on the SMR medium 150. Hence, by overwriting a plurality of the tracks 52_1 to 152_n at a time and reducing a number of times the write head 160 is moved, examples of the present technique may reduce a time needed to overwrite the SMR medium 150. For example, if the threshold number 130 is two, a time needed to overwrite the SMR medium 150 may be cut in half, compared to conventional techniques.

Figure 2:
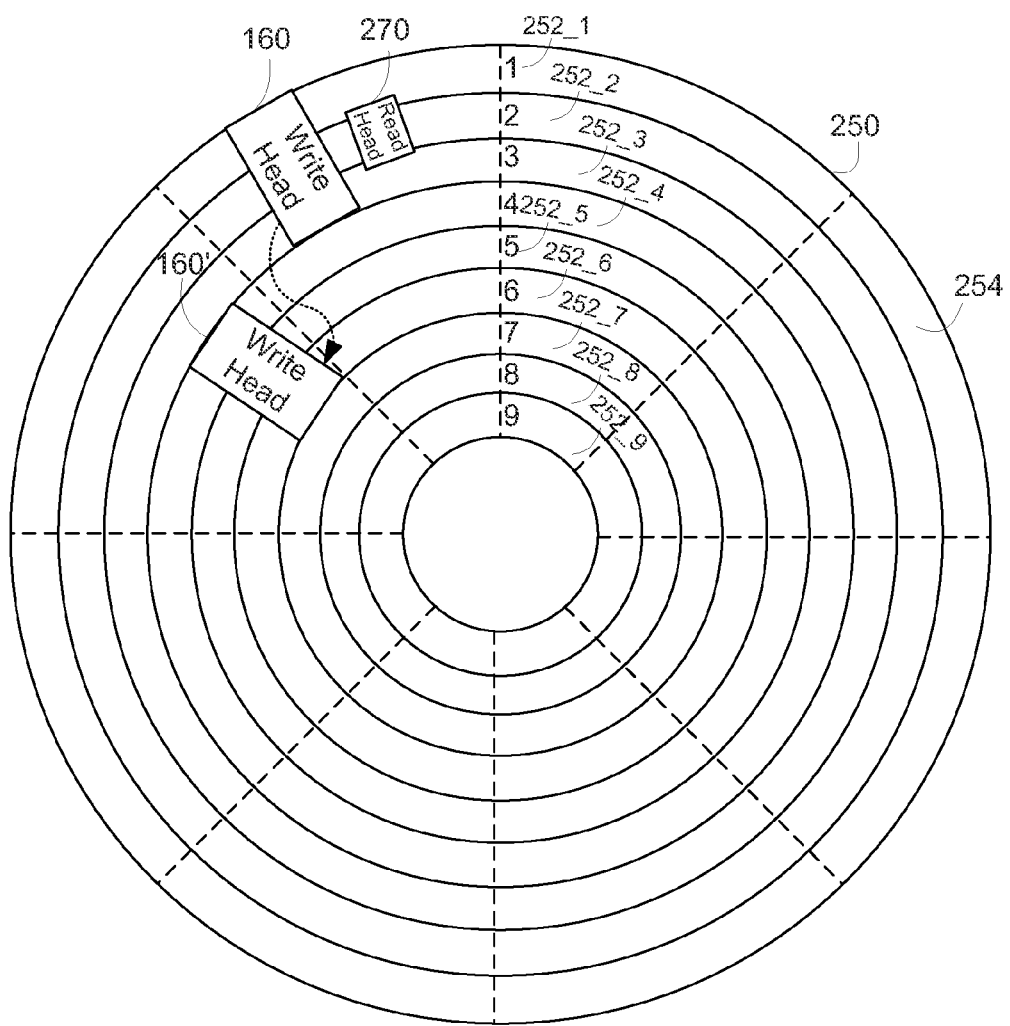
FIG. 2 is example block diagram of the write head of FIG. 1 moving to the next track of a medium.

FIG. 2 is example block diagram of the write head 160 of FIG. 1 moving to the next track of a medium. In FIG. 2, part of the SMR medium 150 is shown as a platter 250 of a hard disk drive (HDD). Here, the platter 250 is shown to have nine overlapping tracks 252_1 to 252_9. However, examples of the present technique may include more or less than nine tracks per platter and more than one platter. The dotted lines may further segment the tracks 252 into sectors 254. Examples of the present technique may include more or less sectors per track than shown in FIG. 2.

Here, the sectors 254 of the plurality of tracks 252_1 to 252_9 are shown to be aligned with each other. However, examples of the present technique may also include the sectors 254 of at least one of the plurality of tracks 252_1 to 252_9 being misaligned with the sectors of another of the plurality of tracks 252_1 to 252_9. The head unit 120 may overwrite positioning information (not shown) of the SMR medium 150 if the sectors 254 of the tracks 252 are misaligned. Alternatively, at least some of the positioning information of the SMR medium 150 may be preserved if the sectors 254 of at least two of the tracks 252 are aligned. The positioning information may include, for example, a track number or a logical block address (LBA) of the SMR medium 150.

In FIG. 2, the write head 160 is shown to be approximately wide enough to cover three overlapping tracks 252 but a read head 270 is shown to be approximately only wide enough to cover a single overlapping track 252. Thus, the write head 160 is larger than the read head 270 of the HDD. Moreover, the write head 160 may only write to a plurality of the tracks 252 at a time, while the read head 270 may read from only one of the tracks 252 at a time. Assuming the write head 160 can overwrite up to 3 tracks 252 simultaneously, the threshold number 130 will be 3. Initially the write head 160 is shown to overwrite the first three tracks 252_1 to 252_3 as the platter 250 completes a revolution. Further, as the write head 160 appears to be starting outward and moving inward, the track 252 closest to the outer edge of the write head 160, such as the first track 252_1 may be considered the current track number in this case.

Thus, the current track number, which is one, may be added to the threshold number 130, which is three, to calculate the next track number 140, which is four. Therefore, as shown in FIG. 2, the head unit 120 controls the write head 160' to move from the first track 252_1 to the fourth track 252_4 after the first three tracks 252_1 to 252_3 have been overwritten, in response to the overwrite command. Further, the head unit 120 may control the write head 160 to not move to the track numbers 252 that do not correspond to offsets of the threshold number 130, in response to the overwrite command. For example, the head unit 120 may ensure that write head 160 moves directly from the first track 252_1 to the fourth track 252_4, and does not stop at the second or third tracks 252_2 or 252_3.

Often, the overwrite command may request that the entire SMR medium 150 or platter 250 be overwritten. In this case, the head unit 120 may control the write head 160 to iteratively repeat this process of overwriting and moving until the entire platter 250 and/or SMR medium 150 is overwritten. The plurality of tracks 252 may be static or dynamic. If the tracks 252 are static, they may not change position within the platter 250. Thus, if there are certain portions of the platter 250 to which tracks may not be written to of the platter 250 or SMR medium 150, the head unit 120 may control the write head 160 to skip over those portions when overwriting the entire SMR medium 150 or platter 250. Yet, if the tracks 252 are dynamic, they may change positions within the platter 250. In this case, the head unit 120 may not know which portions of the of the platter 250 or SMR medium 150 have been written to and therefore, may overwrite an entirety of the platter 240 and/or SMR medium 150.

The head unit 120 may control the write head 160 to overwrite the platter 240 and/or SMR medium 150 with a pattern that includes zeros or ones. For example, all ones, all zeros, alternating ones and zeros, and the like may be written to each sector 254. This pattern may be repeated for any combination of sectors and tracks. Overwriting an entirety of the platter 240 and/or SMR medium 150 may include overwriting every sector of every track. Once the platter 250 and/or SMR medium 150 is overwritten, it becomes unreadable and generally must be formatted in order to be usable again.

Figure 3:
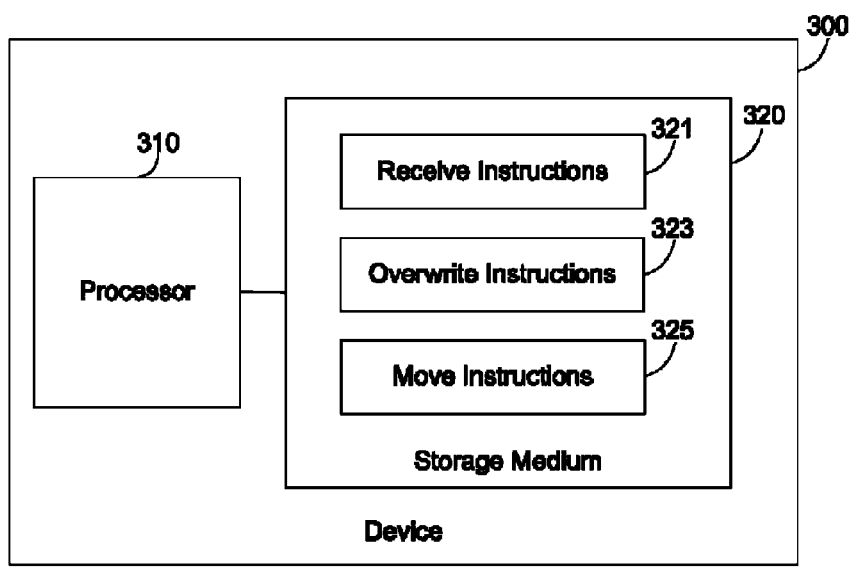
FIG. 3 is an example block diagram of a computing device including instructions for moving a write head over by a threshold number of tracks.

FIG. 3 is an example block diagram of a computing device 300 including instructions for moving a write head over by a threshold number of tracks. In FIG. 3, the computing device 300 includes a processor 310 and a machine-readable storage medium 320. The machine-readable storage medium 320 further includes instructions 321, 323 and 325 for moving the write head over by the threshold number of tracks.

The computing device 300 may be, for example, a controller, a secure microprocessor, a notebook computer, a desktop computer, an all-in-one system, a server, a network device, a wireless device, or any other type of user device capable of executing the instructions 321, 323 and 325. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 321, 323 and 325 to implement moving the write head over by the threshold number of tracks. As an alternative or in addition to retrieving and executing instructions, the processor 310 may include at least one integrated circuit (IC), other control logic, other electronic circuits, or combinations thereof that include a number of electronic components for performing the functionality of instructions 321, 323 and 325.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for moving the write head over by the threshold number of tracks.

Figure 4:
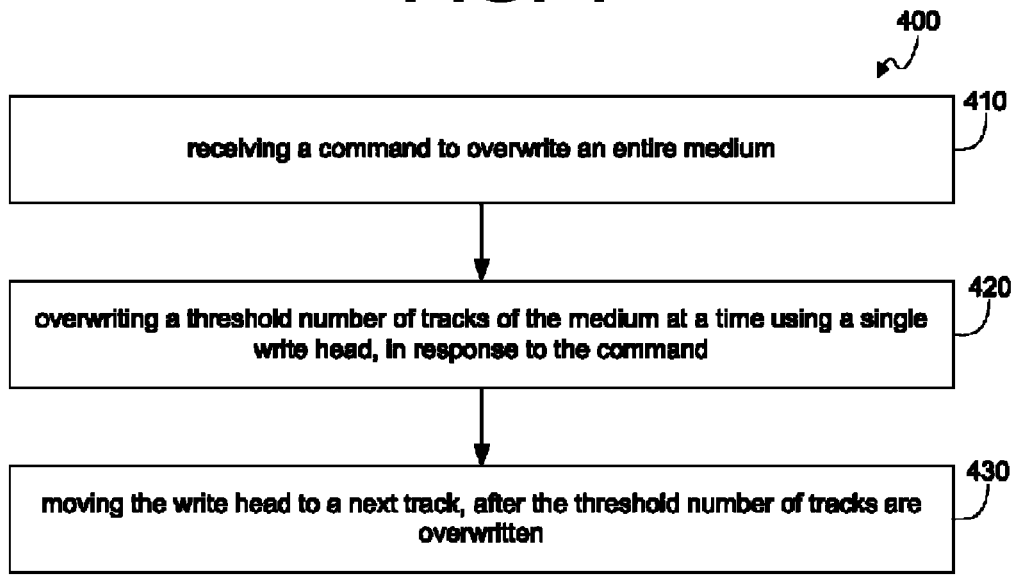
FIG. 4 is an example flowchart of a method for moving a write head to a next track.

Moreover, the instructions 321, 323 and 325 when executed by a processor (e.g., via one processing element or multiple processing elements of the processor) can cause the processor to perform processes, such as, the process of FIG. 4. For example, the receive instructions 321 may be executed by the processor 310 to receive a command to overwrite at least part of a SMR medium (not shown). The SMR medium is explained in greater detail above with respect to FIG. 1.

The overwrite instructions 323 may be executed by the processor 310 to overwrite a threshold number of tracks of the SMR medium at a time in response to the command. For example, a write head (not shown) may overwrite the threshold number of tracks during a single revolution of a platter (not shown) of the SMR medium. The threshold number is greater than one and is explained in greater detail above with respect to FIG. 1. The move instructions 425 may be executed by the processor 310 to move the write head over by the threshold number of tracks, as shown above in greater detail above with respect to FIG. 2.

FIG. 4 is an example flowchart of a method 400 for moving a write head to a next track. Although execution of the method 400 is described below with reference to the device 100, other suitable components for execution of the method 400 can be utilized. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 100 receives a request to command to overwrite a medium 150. Then at, block 420, the device 100 overwrites a threshold number 130 of tracks 152 of the medium 150 at a time using a single write head 160, in response to the command. Next, at block 430, the device 100 moves the write head 160 to a next track 152, after the threshold number 130 of tracks 152 are overwritten. A number of the next track 140 is based on the threshold number 130, as explained above in FIGS. 1 and 2. The threshold number 130 is greater than one, as explained above with respect to FIG. 1.

According to the foregoing, examples of present techniques provide a method and/or device that may take advantage of the larger write head overwriting a plurality of tracks at once by issuing commands to the write head to skip over adjacent tracks which have already been overwritten. Thus, examples may allow for a time to overwrite the medium to be shortened by reducing a number of passes of the write head over the medium.

I claim:

1. A device, comprising:

an interface unit to receive an overwrite command to overwrite at least part of a Shingled Magnetic Recording (SMR) medium; and a head unit to control a write head to overwrite a threshold number of tracks of the SMR medium simultaneously, in response to the overwrite command, wherein the head unit is to control the write head to move to a next track number, the next track number to be based on offsetting a current track number by the threshold number, the current track number to be based on a position of the write head, when the write head is to overwrite the tracks of the SMR medium, and the threshold number is greater than one.

2. The device of claim 1, wherein the head unit is to control the write head to move over a width of the threshold number of tracks that have been overwritten when the head unit controls the write head to move to the next track number.

3. The device of claim 1, wherein,
the current track number is based on a number of the track closest to an edge of the write head, and
the next track number is based on at least one adding the threshold number to and subtracting the threshold number from the current track number.

4. The device of claim 3, wherein,
the current track number is based on the number of the track closest to an inner edge of the write head if the write head is writing outward from a center of the SMR medium, and
the current track number is based on the number of the track closest to an outer edge of the write head if the write head is writing inward towards the center of the SMR medium.

5. The device of claim 1, wherein the head unit is to control the write head to not move to the track numbers that do not correspond to offsets of the threshold number, in response to the overwrite command.

6. The device of claim 1, wherein,
the plurality of tracks are at least one of static and dynamic, and
the head unit is to control the write head to overwrite an entirety of the SMR medium if the plurality of tracks are dynamic.

7. The device of claim 6, wherein,
each of the tracks includes a plurality of sectors,
the sectors of one of the plurality of tracks is at least of one aligned and misaligned with the sectors of another of the plurality of tracks,
the head unit is to overwrite positioning information of the SMR medium if the sectors of the tracks are misaligned, and
the positioning information includes at least one of a track number and a logical block address (LBA) of the SMR medium.

8. A hard disk drive (HDD), comprising:
the device of claim 1;
the SMR medium; and
a read head, wherein
the write head is larger than a read head.

9. The HDD of claim 8, wherein,
the write head is to only write to a plurality of the tracks at a time, and
the read head is to read from only one of the tracks at a time.

10. A method, comprising:
receiving a command to overwrite a medium;
overwriting a threshold number of tracks of the medium at a time using a single write head, in response to the command; and
moving the write head to a next track number, after the threshold number of tracks are overwritten, wherein
the threshold number is greater than one, and
the next track number is based on offsetting a current track number by the threshold number, the current track number to be based on a position of the write head when the write head is overwriting the threshold number of tracks.

11. The method of claim 10, wherein,
the head unit is to control the write head to overwrite the SMR medium with a repeating pattern, and
the write head is larger than a read head of the medium.

12. The method of claim 10, wherein,
the overwriting and moving is iteratively repeated the entire medium is overwritten, and
the medium is written to using Shingled Magnetic Recording (SMR).

13. A non-transitory computer-readable storage medium storing instructions that, if executed by a processor of a device, cause the processor to:
receive a command to overwrite at least part of a Shingled Magnetic Recording (SMR) medium;
overwrite a threshold number of tracks of the SMR medium at a time in response to the command; and
move a write head over by the threshold number of tracks, wherein
the threshold number is greater than one, and
a number of times the write head is moved to overwrite the SMR medium is proportional to the threshold number.

14. The non-transitory computer-readable storage medium of claim 13, wherein a number of times the write head is moved is less than a number of tracks on the SMR medium.

15. The non-transitory computer-readable storage medium of claim 13, wherein the threshold number is based on at least one of a width of the write head, a distance between the write head and the SMR medium, an opacity of air between the write head and the SMR medium, and the number of the tracks the write head can write to with a threshold percentage of certainty.

* * * * *